United States Patent [19]
Landucci

[11] Patent Number: 5,738,361
[45] Date of Patent: Apr. 14, 1998

[54] SNOW BICYCLE

[76] Inventor: Angelo Landucci, 16350, chemin St-Roch, Tracy, Québec, Canada, J3P 5N3

[21] Appl. No.: 855,135

[22] Filed: May 13, 1997

[51] Int. Cl.$^6$ ............................................. B62B 15/00
[52] U.S. Cl. ........................................ 280/12.14; 305/120
[58] Field of Search .............................. 280/7.15, 7.12, 280/12.1, 12.13, 12.14, 284, 285, 286; 180/190, 191, 194, 196; 305/111, 13, 116, 19, 15, 120

[56] References Cited

U.S. PATENT DOCUMENTS

| 1,221,898 | 4/1917 | Palm . | |
|---|---|---|---|
| 3,412,821 | 11/1968 | Humphrey | 180/5 |
| 3,885,641 | 5/1975 | Harris | 180/5 R |
| 3,931,983 | 1/1976 | Kanouse et al. | 280/12.14 |
| 4,146,101 | 3/1979 | Plourde | 180/5 R |
| 4,168,841 | 9/1979 | Uhlyarik | 280/7.12 |
| 4,221,272 | 9/1980 | Kell | 180/190 |
| 4,283,184 | 8/1981 | Berg | 474/203 |
| 5,102,153 | 4/1992 | Rhode | 280/7.14 |
| 5,203,424 | 4/1993 | Gogo et al. | 180/190 |
| 5,316,508 | 5/1994 | Landucci | 440/30 |
| 5,423,559 | 6/1995 | Rhode | 280/12.14 |

FOREIGN PATENT DOCUMENTS

| 345794 | 11/1934 | Canada . |
|---|---|---|
| 631722 | 11/1961 | Canada . |
| 640165 | 4/1962 | Canada . |
| 1278327 | 12/1990 | Canada . |
| 1279683 | 1/1991 | Canada . |
| 2072569 | 4/1991 | Canada . |
| 1297523 | 3/1992 | Canada . |
| 2062549 | 3/1992 | Canada . |
| 2114150 | 1/1994 | Canada . |

*Primary Examiner*—Richard M. Camby
*Attorney, Agent, or Firm*—Collard & Roe, P.C.

[57] ABSTRACT

The snow bicycle comprises a main frame similar to the one used on a conventional bicycle. It features a rear drive wheel assembly removably connected to the main frame. The rear drive wheel assembly comprises two longitudinally-oriented wheels operatively connected between a two-section frame. A track belt is winded around the two wheels and two parallel sets of rollers are provided on each side of the lower inner side of the free track belt to support the rear of the main frame when the bicycle is on the ground. This provides a versatile arrangement that suitably combines stability and the ability of to reach high speed on various types of grounds, particularly snow or ice.

19 Claims, 7 Drawing Sheets

SNOW BICYCLE

BACKGROUND

It is well known that human powered wheeled vehicles, like bicycles, are very difficult to use on a loose or slippery ground as, for example, ground covered with snow or ice. Indeed, on such grounds, the driving wheel of conventional bicycles tends to skid. This considerably slows or possibly destabilises the cyclist and provokes a fall.

Some prior attempts were made to provide snow bicycles with a drive wheel assembly comprising a track. However, none successfully provides a versatile arrangement that suitably combines stability and the ability to reach high speed on various types of grounds, particularly snow or ice.

SUMMARY

It is the object of the present invention to provide a snow bicycle that satisfies the above-identified needs. To do so, the present invention provides a snow bicycle comprising:

- a main frame having a front head tube and a rear chain stay, the rear chain stay comprising a left and a right pipe;
- a front steerable supporting assembly operatively connected to the head tube to support the front of the frame when the bicycle is on the ground;
- a pedal drive assembly operatively connected to the frame;
- a rear drive wheel unit comprising:
  - a drive wheel frame having two parallel sections respectively aligned with the left and the right pipe of the chain stay, each section comprising an oblique member downwardly projecting towards the rear and a horizontal member having a rear end connected to a lower end of the corresponding oblique member;
  - a connecting means for removably connecting the drive wheel frame to the chain stay;
  - a first longitudinally-oriented wheel operatively connected between the two sections of the drive wheel frame;
  - a second longitudinally-oriented wheel operatively connected between the two sections of the drive wheel frame and longitudinally aligned with the first wheel, the front wheel and the second wheel having a substantially identical diameter;
  - a track belt having an inner side winded around the first and second wheel; and
  - two parallel sets of rollers, each set comprising a plurality of spaced-apart rollers operatively connected to and extending downwardly from a respective horizontal member, each roller being in engagement with the inner side of the track belt to support the rear of the frame when the bicycle is on the ground; and
- a transmission mechanism to mechanically connect the pedal drive assembly to the second wheel.

A non restrictive description of a preferred embodiment will now be given with reference to the appended drawings.

IDENTIFICATION OF THE COMPONENTS

Figure 1:
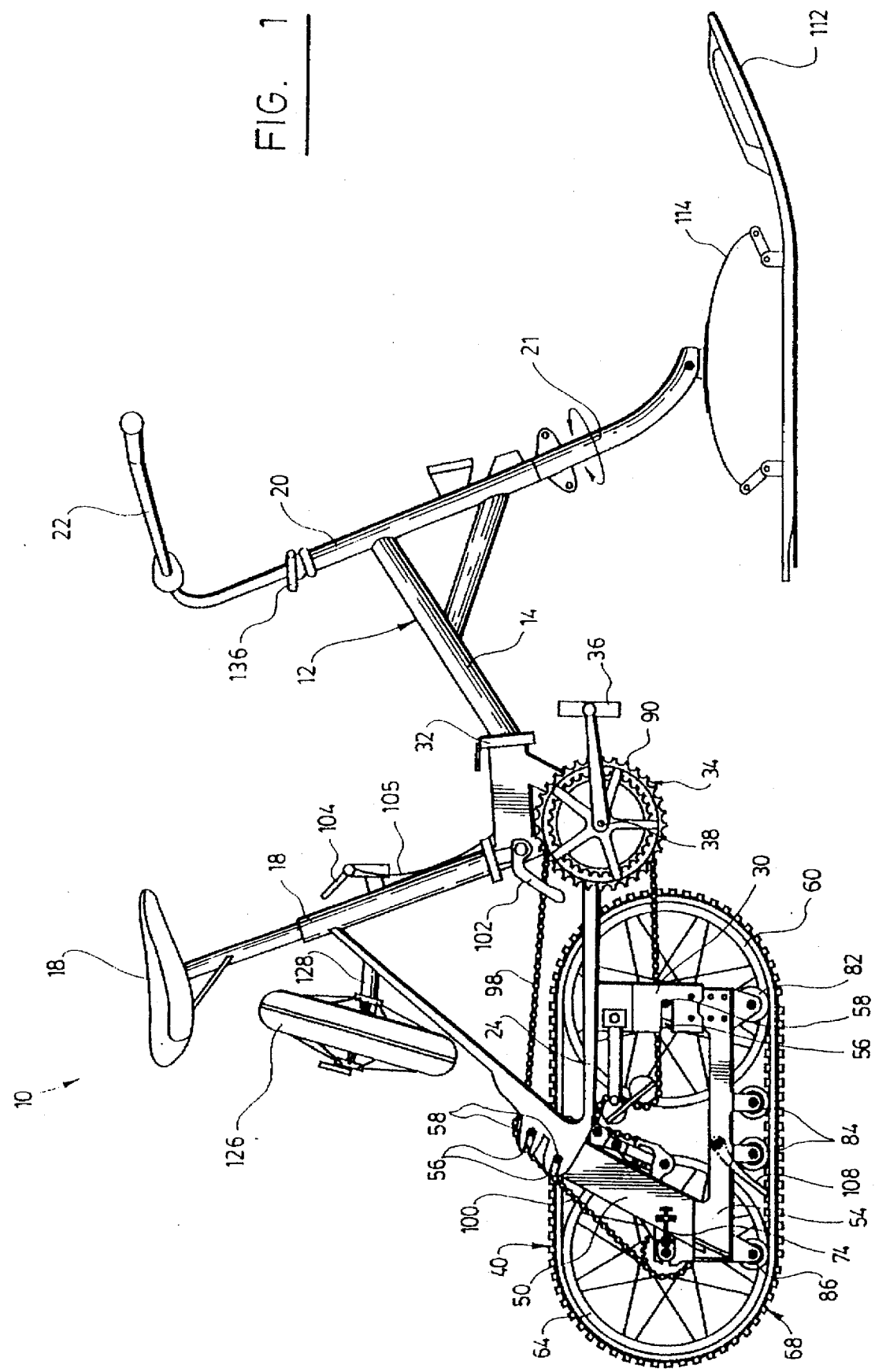
FIG. 1 is a side elevational view showing the snow bicycle according to a possible embodiment of the present invention, showing an example of the bicycle with a ski assembly.

The following is a list of the reference numerals, along with the names of the corresponding components, that are used in the appended drawings and in the description.

10 snow bicycle
12 main frame
14 down tube
16 seat tube
18 seat
20 front head tube
21 fork
22 handlebars
24 rear chain stay
30 side plates
32 lockable hinge (of the main frame)
34 pedal drive assembly
36 pedals
38 pivot (of the pedal drive assembly)
40 rear drive wheel unit
42 drive wheel frame
44 left section
46 right section
48 oblique member (of the left section)
50 oblique member (of the right section)
52 horizontal member (of the left section)
54 horizontal member (of the right section)
56 slots
58 fasteners
60 first wheel
62 pivot (of the first wheel)
64 second wheel
66 pivot (of the second wheel)
68 track belt
70 inner side (of the track belt)
72 outer side (of the track belt)
74 screw mechanism (of the track belt)
78 brackets (of the rollers)
80 pivots (of the rollers)
82 front rollers
84 intermediary rollers
86 rear rollers
88 hub
90 first sprocket gear(s)
92 second sprocket gear
94 third sprocket gear
96 fourth sprocket gear
98 first sprocket chain
100 second sprocket chain
102 front derailleur 104 lever (of the front derailleur)
105 cable
106 rear derailleur
108 V-shaped knife
110 pivot (of the knife)
112 ski
114 leaf spring
116 single ice blade
117 shock absorber
118 opposite ice blades
120 transverse bar (of the opposite ice blades)
122 steering system (of the opposite ice blades)
124 tie rods (of the opposite ice blades)
126 front wheel
128 rear attachment
130 steering tube
132 lower sleeve tube
134 fastener
136 releasable fastener

DESCRIPTION

FIG. 1 shows a snow bicycle (10) according to a possible embodiment of the present invention. The bicycle (10) comprises a main frame (12) which may be, as illustrated, substantially similar to a conventional bicycle frame. This main frame (12) comprises a down tube (14), a seat tube (16) for supporting a seat (18), a front head tube (20), handlebars (22) and a rear chain stay (24). The rear chain stay (24) comprises a left and a right pipe extending towards the rear. The main frame (12) may also comprise a lockable hinge (32) located on the down tube (14) for collapsing the main frame (12).

The snow bicycle (10) is called as such because it is primarily designed for the winter season. However, it is possible to use the bicycle (10) during other seasons. For instance, it is possible to use the bicycle (10) on conventional dry pavement, mud or grass. It must be understood that the term "snow" should not be interpreted as being restrictive.

The front of the main frame (12) is supported by a front steerable supporting assembly that is operatively connected to the head tube (20). This assembly is actuated by the user through the handlebars (22). Depending on the nature of the ground on which the bicycle (10) will travel, it is possible to choose among a plurality of removable implements such as a ski assembly (FIG. 1), a single ice blade assembly (FIG. 5), a pair of opposite ice blades assembly (FIG. 6) and a wheel (FIG. 7). Those implements will be described later.

Since the bicycle (10) is human-powered, it comprises a pedal drive assembly (34) operatively connected to the main frame (12). The pedal drive assembly (34) comprises opposite pedals (36) that are operatively connected to a pivot (38) located in the lower side of the main frame (12).

The bicycle (10) further comprises a rear drive wheel unit (40) that is preferably removably connected to the main frame (12) for easing the storage or the transportation by hand. Alternatively, one can construct the bicycle (10) without making the rear drive wheel unit (40) removable.

The rear drive wheel unit (40) comprises a drive wheel frame (42) having two parallel sections (44,46) respectively aligned with the left and the right pipe of the chain stay (24). Each section (44,46) comprises an oblique member (48,50) downwardly projecting towards the rear and a substantially horizontal member (52,54). The rear end of each horizontal member (52,54) is connected to a lower end of the corresponding oblique member (48,50). Preferably, the left section (44) and the right section (46) are substantially symmetrical with reference to a vertical plane.

The drive wheel frame (42) is removably connected to the chain stay (24). One possible way is to provide a plurality of slots (56) and corresponding fasteners (58). It is then possible to connect the upper end of the oblique members (48,50) to the chain stay (24) and to connect the front end of the horizontal members (52,54) to vertical side plates (30) that are extending downwardly and rigidly connected to the left pipe (26) or the right pipe (28), respectively.

The drive wheel frame (42) further comprises a first longitudinally-oriented wheel (60) operatively connected between the two sections (44,46) by means of a pivot (62). Then, a second longitudinally-oriented wheel (64) is provided and is operatively connected between the two sections (44,46) by means of a pivot (66). The second wheel (64) is longitudinally aligned with the first wheel (60) and an endless track belt (68) is winded around them. The front wheel (60) and the second wheel (64) have a substantially identical diameter so that the path of the track belt (68) be as uniform as possible during the rotation thereof. The track belt (68) comprises a tread design on its outer side (72) to improve the traction. It may also comprise studs (not shown). The tension in the track belt (68) may be adjusted by a screw mechanism (74) that moves the second wheel (64) longitudinally.

Two parallel sets of rollers are provided to support the rear of the frame when the bicycle (10) is on the ground. Each set comprises a plurality of spaced-apart rollers (82,84,86) operatively connected to and extending downwardly from a respective horizontal member (52,54) by means of individual brackets (78) with corresponding pivots (80). Each roller (82,84,86) is in engagement with the inner side (70) of the track belt (68) and is significantly smaller than the first (60) and the second wheel (64). An example of a suitable type of roller (82,84,86) is a roller such as used on an in-line skate.

Figure 2:
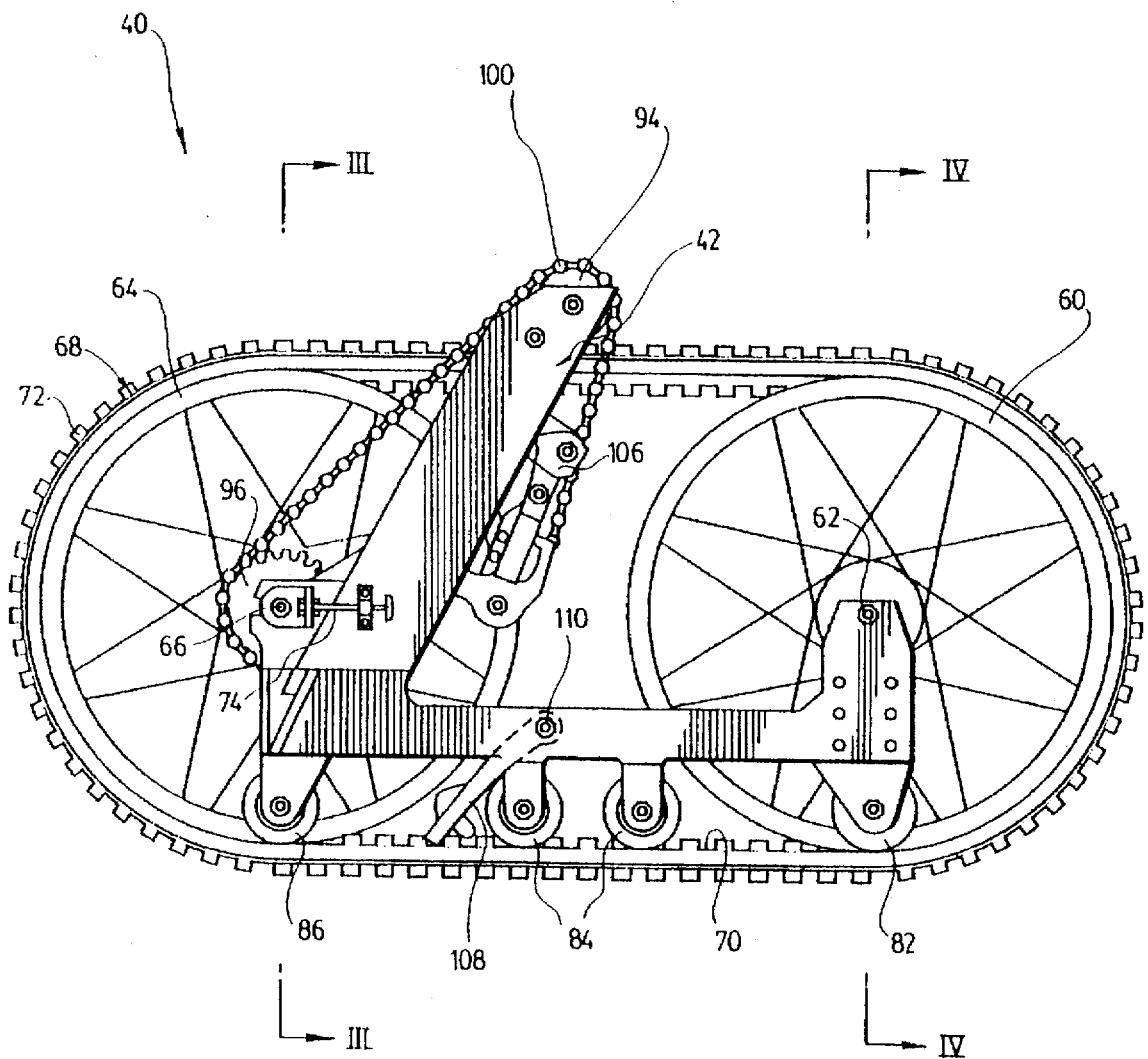
FIG. 2 is an enlarged side elevational view of the rear drive wheel unit of FIG. 1.
Figure 3:
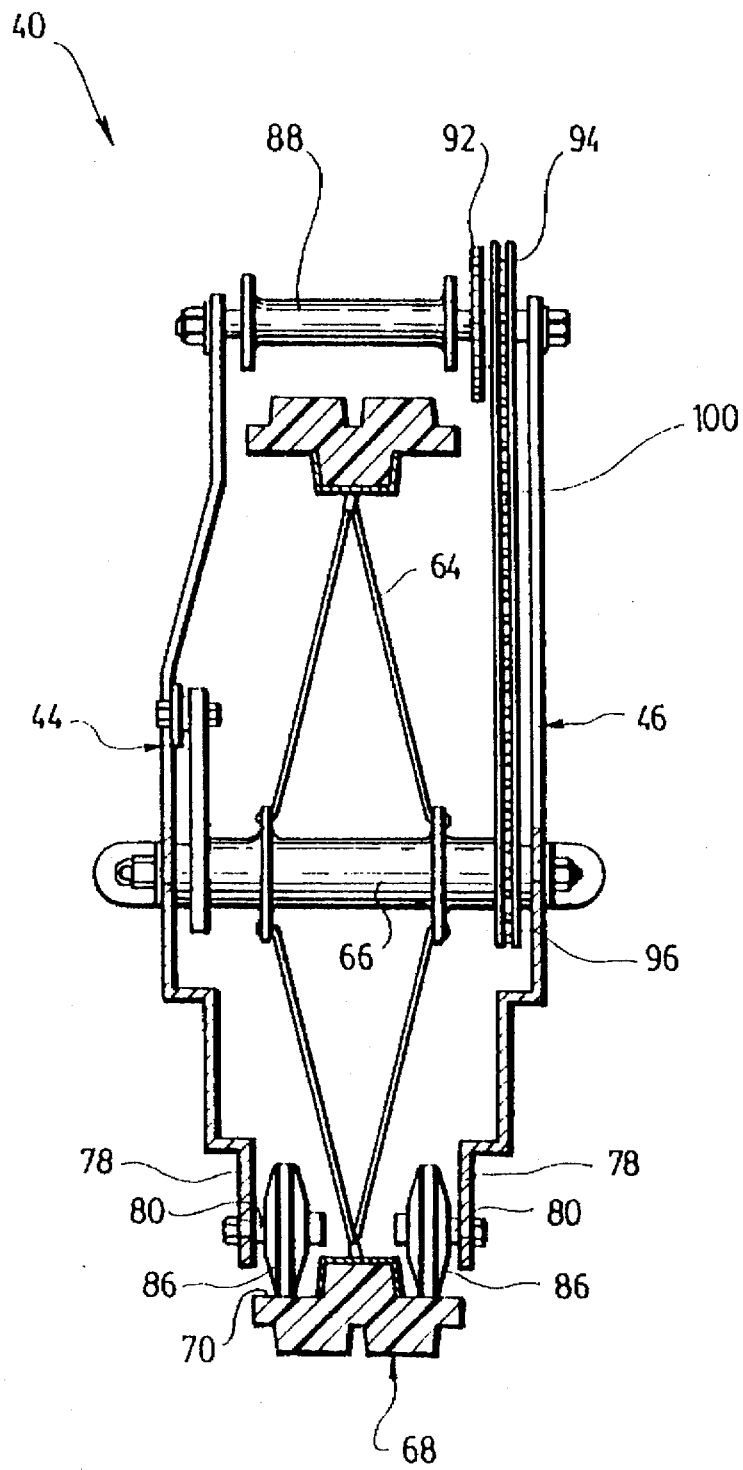
FIG. 3 is a cross-sectional view of the rear drive wheel unit taken along line III—III of FIG. 2.
Figure 4:
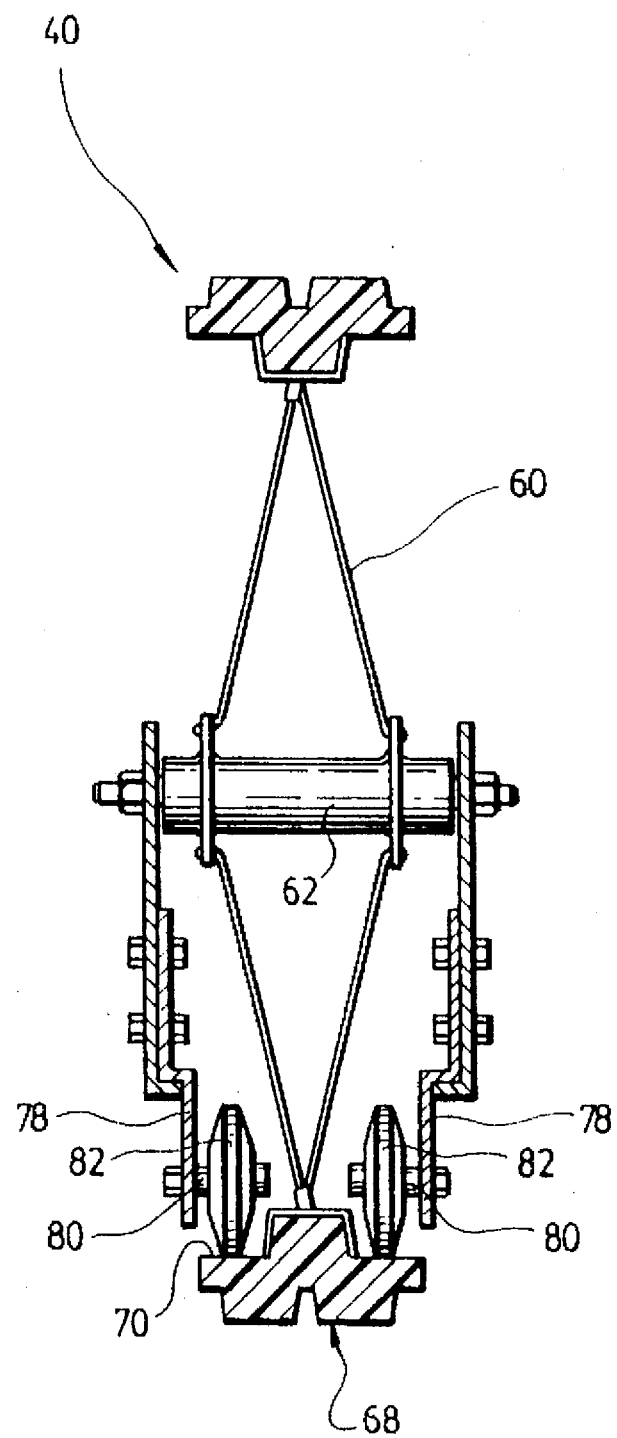
FIG. 4 is a cross-sectional view of the rear drive wheel unit taken along line IV—IV of FIG. 2.

Preferably, each set of rollers comprises a front roller (82) juxtaposed to the first wheel (60), which means that the roller (82) is laterally offset with the first wheel (60) and that the bottom of the first wheel (60) and the bottom of the roller (82) are substantially side-by-side. This allows the weight to be divided between the front rollers (82) and the first wheel (60). Then, a rear roller (86) is juxtaposed to the second wheel (64) and at least one intermediary roller (84) is located between the corresponding front (82) and rear rollers (86) and substantially longitudinally aligned therewith. Two intermediary rollers (84) are provided on each set in the preferred embodiment shown in FIGS. 1 and 2.

A transmission mechanism is used to mechanically connect the pedal drive assembly (34) to the second wheel (64). Various arrangements are possible. Preferably, the transmission mechanism comprises a set of at least two first sprocket gears (90) rigidly connected to the pedal drive assembly (34). A hub (88), operatively connected between the upper end of the oblique members (48,50), is provided to bear a second (92) and a third sprocket gear (94). A first sprocket chain (98) has one end winded around one of the first gears (90) and another end winded around the second gear (92). A front derailleur (102) may be used to selectively align the first chain (98) with one of the first gears (90). The user controls the front derailleur (102) with a lever (104) and through a corresponding cable (105). A fourth sprocket gear (96) is rigidly connected to and coaxial with the second wheel (64). Then, a second sprocket chain (100) is winded around the third gear (94) and around the fourth gear (96) to complete the mechanical connection.

Preferably, a stretching means may be used for tensioning the first chain (98). This may be done by using a conventional rear derailleur (106) without the ability of shifting gears. A similar additional rear derailleur (107) may be provided for tensioning the second chain (100).

A guarding device may be provided to prevent snow or ice debris from accumulating in front of the second wheel (64) and the rear rollers (86). Preferably, the guarding device comprises an inverted V-shaped knife (108) operatively connected in front of the second wheel (64) between the horizontal members (52,54) by means of a pivot (110). The knife (108) pushes away snow or ice debris to help prevent a possible jam between the second wheel (64) and the track belt (68), or between the rear rollers (86) and the track belt (68).

As aforesaid, it is possible to choose among a plurality of removable implements such as a ski assembly, a single ice blade assembly, opposite ice blades assembly and a wheel (126). The ski assembly is shown in FIG. 1. It may comprise a ski (112) and a leaf spring (114) to absorb the shocks.

Figure 5:
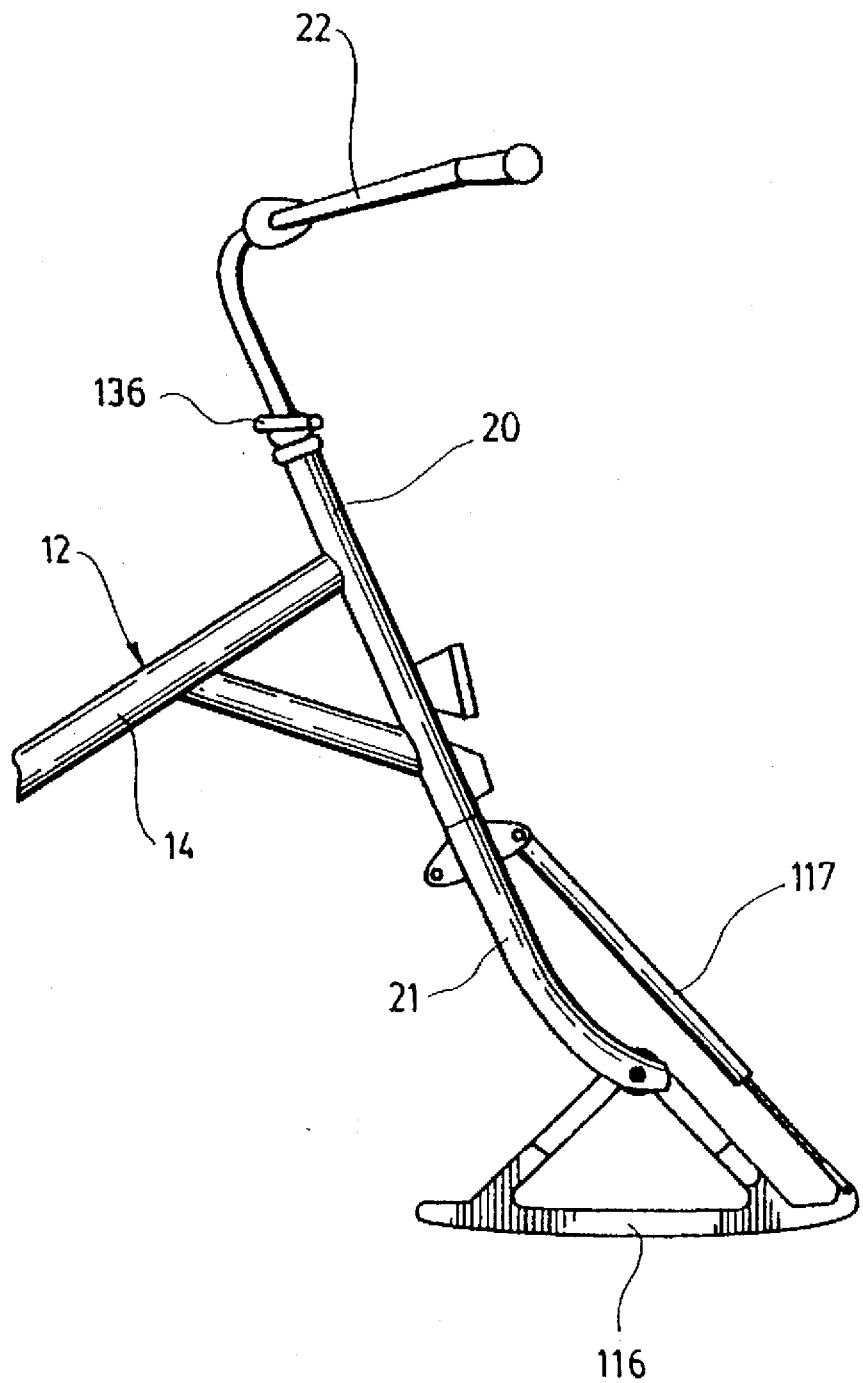
FIG. 5 is an enlarged view of the front steerable supporting assembly according to a preferred embodiment of the present invention, showing an example of the assembly with a single ice blade.

FIG. 5 shows an example of a single ice blade assembly to be used on an icy surface. The blade (116) is connected to the conventional fork (21) that is steerable using the handlebars (22). The fork (21) comprises an upper tube (130) that is inserted upwardly in the head tube (20) and connected to the handlebars (22) by a fastener (132). The blade assembly may comprise a front shock absorber (117) to damp the irregularities of the ground while riding thereon. The upper end of the shock absorber (117) is removably connected to the fork (21) by means of a cotter pin.

Figure 6:
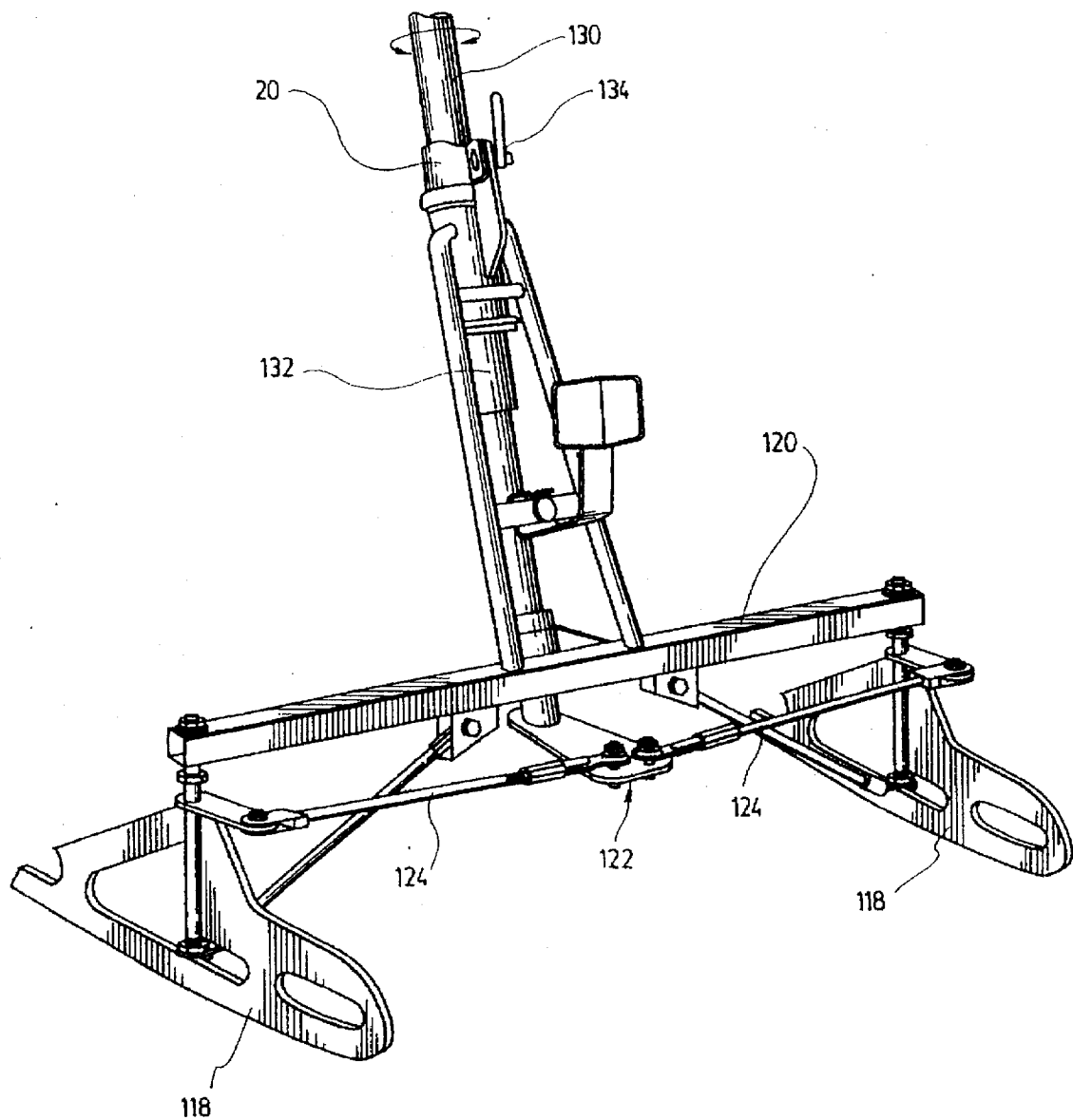
FIG. 6 is an enlarged view of the lower part of the front steerable supporting assembly according to a preferred embodiment of the present invention, showing an example of the assembly with opposite ice blades.
Figure 7:
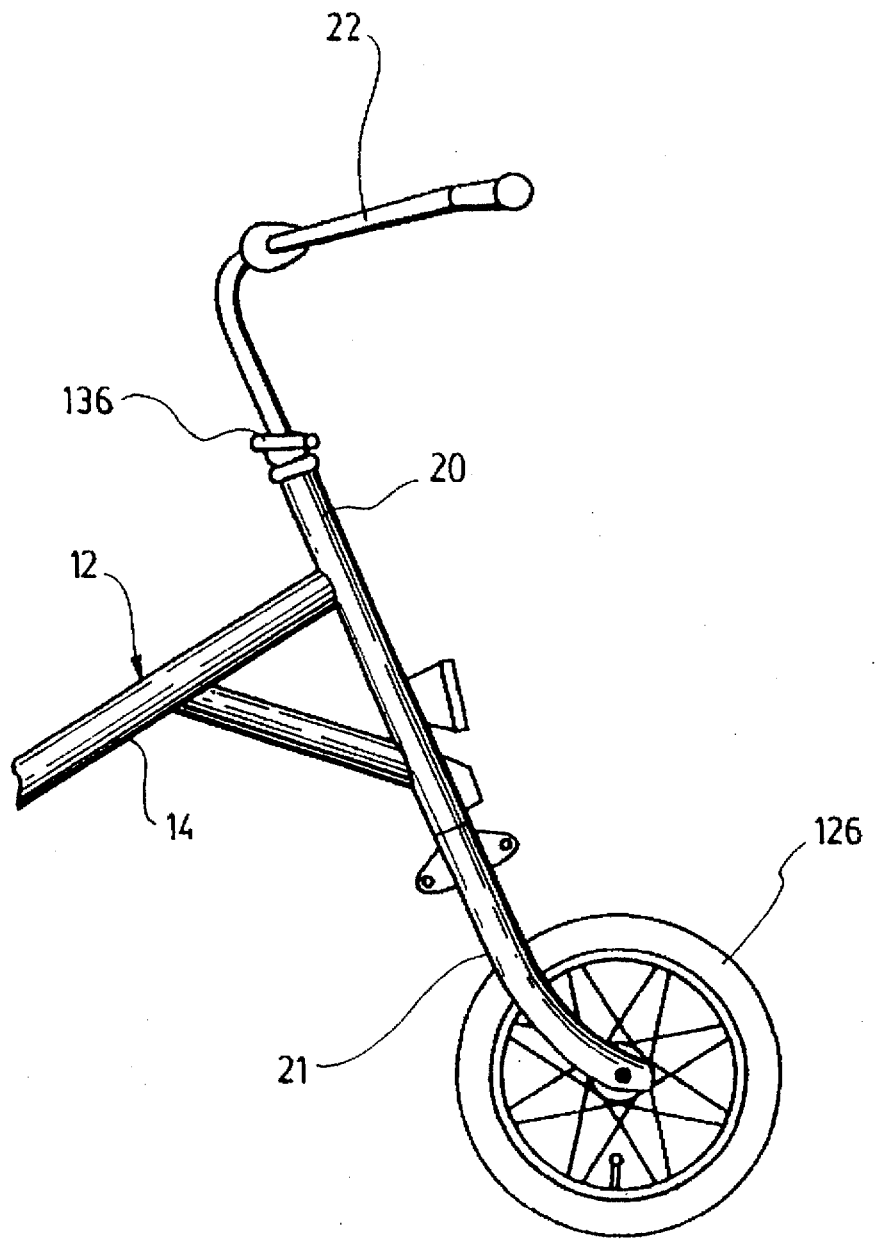
FIG. 7 is an enlarged view of the front steerable supporting assembly according to a preferred embodiment of the present invention, showing an example of the assembly with a wheel.

FIG. 6 shows another possibility for the front steerable supporting assembly. It consists of an opposite ice blades assembly that comprises a transverse static bar (120) connected to the main frame (12) and two opposite and parallel ice blades (118) operatively connected to a respective end of the bar (120). A steering system (122) is provided to steer the ice blades (118). This system (122) comprises tie rods (124) connected to the handlebars (22) by means of the steering tube (130) inserted and pivoting in the head tube (20). The bar (120) is connected to the main frame (12) by a lower sleeve tube (132) connected to the lower part of the head tube (20) by a fastener (134), such as a cotter pin. The upper end of the steering tube (130) is connected to the handlebars (22) by means of a releasable fastener (136).

FIG. 7 shows a front wheel (126) operatively connected to the fork (21). This wheel (126) may always be transported on the bicycle (10) by connecting it to the main frame (12) using an appropriate rear attachment (128), as shown in FIG. 1. This may be very useful in case the ice or snow surface is discontinued. One may also use the wheel (126) permanently if desired.

Although a preferred embodiment of the invention has been described in detail herein and illustrated in the accompanying drawings, it is to be understood that the invention is not limited to this precise embodiment and that various changes and modifications may be effected therein without departing from the scope or spirit of the present invention.

What is claimed is:

1. A snow bicycle comprising:
    a main frame having a front head tube and a rear chain stay, the rear chain stay comprising a left and a right pipe;
    a front steerable supporting assembly operatively connected to the head tube to support the front of the frame when the bicycle is on the ground;
    a pedal drive assembly operatively connected to the frame;
    a rear drive wheel unit comprising:
        a drive wheel frame having two parallel sections respectively aligned with the left and the right pipe of the chain stay, each section comprising an oblique member downwardly projecting towards the rear and a horizontal member having a rear end connected to a lower end of the corresponding oblique member;
        a connecting means for removably connecting the drive wheel frame to the chain stay;
        a first longitudinally-oriented wheel operatively connected between the two sections of the drive wheel frame;
        a second longitudinally-oriented wheel operatively connected between the two sections of the drive wheel frame and longitudinally aligned with the first wheel, the front wheel and the second wheel having a substantially identical diameter;
        a track belt having an inner side winded around the first and second wheel; and
        two parallel sets of rollers, each set comprising a plurality of spaced-apart rollers operatively connected to and extending downwardly from a respective horizontal member, each roller being in engagement with the inner side of the track belt to support the rear of the frame when the bicycle is on the ground; and
    a transmission mechanism to mechanically connect the pedal drive assembly to the second wheel.

2. A snow bicycle according to claim 1, wherein each set of rollers comprises:
    a front roller juxtaposed to the first wheel;
    a rear roller juxtaposed to the second wheel; and
    at least one intermediary roller located between the corresponding front and rear rollers and substantially longitudinally aligned therewith.

3. A snow bicycle according to claim 2, wherein each set of rollers comprises two intermediary rollers in registry with each other.

4. A snow bicycle according to claim 1, wherein the transmission mechanism comprises:
    a first sprocket gear rigidly connected to the pedal drive assembly;
    a hub operatively connected between an upper end of the oblique members, the hub comprising a second and a third sprocket gear coaxial therewith;
    a first sprocket chain having one end winded around the first gear and another end winded around the second gear;
    a fourth sprocket gear rigidly connected to and coaxial with the second wheel; and
    a second sprocket chain having one end winded around the third gear and another end winded around the fourth gear.

5. A snow bicycle according to claim 1, wherein the transmission mechanism comprises:
    a set of at least two first coaxial sprocket gears rigidly connected to the pedal drive assembly;
    a hub operatively connected between an upper end of the oblique members, the hub comprising a second and a third sprocket gear coaxial therewith;
    a first sprocket chain having one end winded around one of the first gears and another end winded around the second gear;
    a front derailleur to selectively align the first chain with one of the first gears;

a stretching device to create a tension in the first chain;

a fourth sprocket gear rigidly connected to and coaxial with the second wheel; and a second sprocket chain having one end winded around the third gear and another end winded around the fourth gear.

6. A snow bicycle according to claim 5, further comprising an additional stretching device to create a tension in the second chain.

7. A snow bicycle according to claim 1, further comprising a guarding device to prevent snow or ice from accumulating in front of the second wheel.

8. A snow bicycle according to claim 7, wherein the guarding device comprises an inverted V-shaped knife operatively connected in front of the second wheel between the horizontal members of the drive wheel frame.

9. A snow bicycle according to claim 1, wherein the front steerable supporting assembly comprises a ski.

10. A snow bicycle according to claim 1, wherein the front steerable supporting assembly comprises a single ice blade.

11. A snow bicycle according to claim 1, wherein the front steerable supporting assembly comprises:

a transverse static bar connected to the main frame;

two opposite and parallel ice blades operatively connected to a respective end of the bar; and an actuating mechanism to steer the ice blades.

12. A snow bicycle according to claim 1, wherein the front steerable supporting assembly comprises a wheel.

13. A snow bicycle according to claim 1, wherein the main frame comprises a down tube provided with a lockable hinge.

14. A snow bicycle comprising:

a main frame having a front head tube and a rear chain stay, the rear chain stay comprising a left and a right pipe;

a front steerable supporting assembly operatively connected to the head tube to support the front of the frame when the snow bicycle is on the ground;

a pedal drive assembly operatively connected to the frame;

a rear drive wheel unit comprising:

a drive wheel frame having two parallel sections respectively vertically aligned with the left and the right pipe of the chain stay, each section comprising an oblique member downwardly projecting towards the rear and a horizontal member having a rear end connected to a lower end of the corresponding oblique member;

a connecting means for removably connecting the drive wheel frame to the chain stay;

a first longitudinally-oriented wheel operatively connected between the two sections of the drive wheel frame;

a second longitudinally-oriented wheel operatively connected between the two sections of the drive wheel frame and longitudinally aligned with the first wheel, the front wheel and the second wheel having a substantially identical diameter;

a track belt having an inner side winded around the first and second wheel; and two parallel sets of rollers, each set comprising a plurality of spaced-apart rollers operatively connected to and extending downwardly from a respective horizontal member, each roller being in engagement with the inner side of the track belt to support the rear of the frame when the snow bicycle is on the ground, each set of rollers comprising a front roller juxtaposed to the first wheel, a rear roller juxtaposed to the second wheel and at least one intermediary roller located between the corresponding front and rear rollers and substantially longitudinally aligned therewith;

a transmission mechanism to mechanically connect the pedal drive assembly to the second wheel, the transmission mechanism comprising:

a set of at least two coaxial first sprocket gears rigidly connected to the pedal drive assembly;

a hub operatively connected between an upper end of the oblique members, the hub comprising a second and a third sprocket gear coaxial therewith;

a first sprocket chain having one end winded around one of the first gears and another end winded around the second gear;

a front derailleur to selectively align the first chain with one of the first gears;

a first stretching device to create a tension in the first chain;

a fourth sprocket gear rigidly connected to and coaxial with the second wheel;

a second sprocket chain having one end winded around the third gear and another end winded around the fourth gear; and a second stretching device to create a tension in the second chain; and an inverted V-shaped knife operatively connected in front of the second wheel between the horizontal members of the drive wheel frame.

15. A snow bicycle according to claim 14, wherein the front steerable supporting assembly comprises a ski.

16. A snow bicycle according to claim 14, wherein the front steerable supporting assembly comprises a single ice blade.

17. A snow bicycle according to claim 14, wherein the front steerable supporting assembly comprises:

a transverse static bar connected to the main frame;

two opposite and parallel ice blades operatively connected to a respective end of the bar; and an actuating mechanism to steer the ice blades.

18. A snow bicycle according to claim 14, wherein the front steerable supporting assembly comprises a wheel.

19. A snow bicycle according to claim 14, wherein the main frame comprises a down tube provided with a lockable hinge.

* * * * *